(12) United States Patent
Jain et al.

(10) Patent No.: US 11,653,603 B2
(45) Date of Patent: May 23, 2023

(54) TURBO TAPE PC FOR CONTINUOUS FLOW

(71) Applicant: Jain Irrigation Systems Limited, Jalgaon (IN)

(72) Inventors: Ajit Bhavarlal Jain, Bambhori (IN); Michael Patrick DeFrank, Madera, CA (US)

(73) Assignee: Jain Irrigation Systems Limited, Bambhori (IN)

( * ) Notice: Subject to any disclaimer, the term of this patent is extended or adjusted under 35 U.S.C. 154(b) by 0 days.

(21) Appl. No.: 14/130,198

(22) PCT Filed: Dec. 26, 2013

(86) PCT No.: PCT/IN2013/000802
§ 371 (c)(1),
(2) Date: Dec. 30, 2013

(87) PCT Pub. No.: WO2014/102823
PCT Pub. Date: Jul. 3, 2014

(65) Prior Publication Data
US 2015/0296723 A1 Oct. 22, 2015

(30) Foreign Application Priority Data
Dec. 27, 2012 (IN) .......................... 3651/MUM/2012

(51) Int. Cl.
*A01G 25/02* (2006.01)

(52) U.S. Cl.
CPC .................................. *A01G 25/023* (2013.01)

(58) Field of Classification Search
CPC ................ A01G 25/023; A01G 25/026; A01G 25/00–167

(Continued)

(56) References Cited

U.S. PATENT DOCUMENTS

| | | | | |
|---|---|---|---|---|
| 3,426,544 A | * | 2/1969 | Robert | A01G 25/06 405/44 |
| 4,984,739 A | * | 1/1991 | Allport | A01G 25/02 239/71 |

(Continued)

OTHER PUBLICATIONS

International Search Report issued in International Application No. PCT/IN2013/000802 dated Jan. 29, 2015.

(Continued)

*Primary Examiner* — Steven M Cernoch
*Assistant Examiner* — Juan C Barrera
(74) *Attorney, Agent, or Firm* — McCarter & English, LLP

(57) ABSTRACT

The emitter attachable to a fluid conduit comprises a fluid inlet portion capable of taking in fluid from the fluid conduit. The fluid from the inlet portion moves to the pressure compensating or reducing portion which comprises a set of teeth which are arranged in a way so as to impede the flow of liquid thereby reducing the pressure. Downstream the pressure compensating portion is the output portion which communicates with an aperture in the fluid conduit to enable distributing the fluid to the environment. The base of the emitter is flexible allowing movement of the base by virtue of the pressure gradient. When the pressure of the fluid is reduced in the pressure compensating portion, a pressure gradient is created across the base and this result in the fluid in the fluid conduit moving the base towards the fluid conduit thereby reducing the volume of the cavity of the emitter.

8 Claims, 3 Drawing Sheets

(58) Field of Classification Search
USPC .................................... 239/542, 547
See application file for complete search history.

(56) References Cited

U.S. PATENT DOCUMENTS

| | | | |
|---|---|---|---|
| 5,620,143 A * | 4/1997 | Delmer .................. | A01G 25/02 |
| | | | 239/562 |
| 5,722,601 A | 3/1998 | DeFrank et al. | |
| 5,957,391 A | 9/1999 | DeFrank et al. | |
| 6,116,523 A * | 9/2000 | Cabahug .............. | A01G 25/023 |
| | | | 239/542 |
| 6,308,902 B1 | 10/2001 | Huntley | |
| 6,736,337 B2 * | 5/2004 | Vildibill ............... | A01G 25/023 |
| | | | 239/533.1 |
| 6,886,761 B2 | 5/2005 | Cohen | |
| 7,735,758 B2 * | 6/2010 | Cohen .................. | A01G 25/023 |
| | | | 239/542 |
| 8,317,111 B2 * | 11/2012 | Cohen .................. | A01G 25/023 |
| | | | 239/542 |
| 2008/0105768 A1 * | 5/2008 | Kertscher ............ | A01G 25/026 |
| | | | 239/542 |
| 2009/0020634 A1 * | 1/2009 | Schweitzer et al. .... | B05B 12/08 |
| | | | 239/542 |
| 2013/0248622 A1 * | 9/2013 | Kim ....................... | B29C 48/13 |
| | | | 264/154 |

OTHER PUBLICATIONS

Written Opnion issued in International Application No. PCT/IN2013/000802 dated Jan. 29, 2015.

* cited by examiner

TURBO TAPE PC FOR CONTINUOUS FLOW

CROSS-REFERENCE TO RELATED PATENT APPLICATIONS

This application is a 35 U.S.C. § 371 national stage filing of International Application No. PCT/IN2013/000802, filed Dec. 26, 2013, which claims the benefit of Indian Patent Application No. 3651/MUM/2012, filed on Dec. 27, 2012. The contents of each of the foregoing applications are incorporated herein by reference in their entireties.

FIELD OF THE INVENTION

The present invention relates to emitters for drip irrigation, and specifically to pressure compensating emitters.

BACKGROUND OF THE INVENTION

Conventionally, a drip tube product with a continuous flow path with inlets is separated into individual emitters by the design of the inserted ribbon using a crossover. The ribbon is bonded into the main tube via insertion through a crosshead die and then pressed against the tube to bond the ribbon to the tube. An outlet is then laser shot or slit at the appropriate point. This type of process has been used in the irrigation industry by several companies. The flow rates of the products made using this process are dependent on pressure in the desired range of operation. These products are energy efficient and run in a pressure range of 6 to 15 psi. Depending on the design the flow rate of the emitters can fall off as much as 50% or more.

Hence, there is a need to compensate for pressure and allow for a uniform distribution of water greatly improving crop uniformity and energy usage.

OBJECTIVE OF THE INVENTION

1. It is the primary objective of the present invention to compensate pressure variations of incoming water
2. It is another objective of the present invention to allow uniform distribution and output of water

SUMMARY OF THE INVENTION

According to an aspect of an invention there is disclosed an emitter for discharging liquid. The emitter comprises an elongated frame such that the periphery encloses a cavity therewith, the periphery enabling attachment of the elongated frame to an interior surface of a fluid conduit. The base is arranged to deflect in response to a pressure differential between a pressure in the cavity and a pressure in a fluid flow passage of the fluid conduit. The emitter further comprises a plurality of intervals disposed in the periphery at a first end of the elongated frame, the plurality of intervals enabling fluid communication between the cavity and the fluid flow passage and arranged to receive fluid from the fluid flow passage. The emitter further comprises a plurality of projections disposed approximately at a middle portion of the elongated frame and extending from the periphery on both sides of the elongated frame towards a center of the cavity. Each of the plurality of projections has a first surface that slopes downwards from the periphery towards the center of the cavity. The plurality of projections are arranged to reduce the pressure of fluid flowing through the cavity and wherein the plurality of projections are arranged to deflect with the deflection of the base. The cavity at a second end is arranged to receive pressure compensated fluid from the middle portion and wherein the cavity is arranged to communicate fluidly through an aperture on the fluid conduit, wherein the first end and the second end are linearly opposite end portions of the elongated frame.

BRIEF DESCRIPTION OF DRAWINGS

Exemplary embodiments of the present invention are described hereinafter with reference to the following drawings, in which.

DETAILED DESCRIPTION OF THE INVENTION

Figure 1:
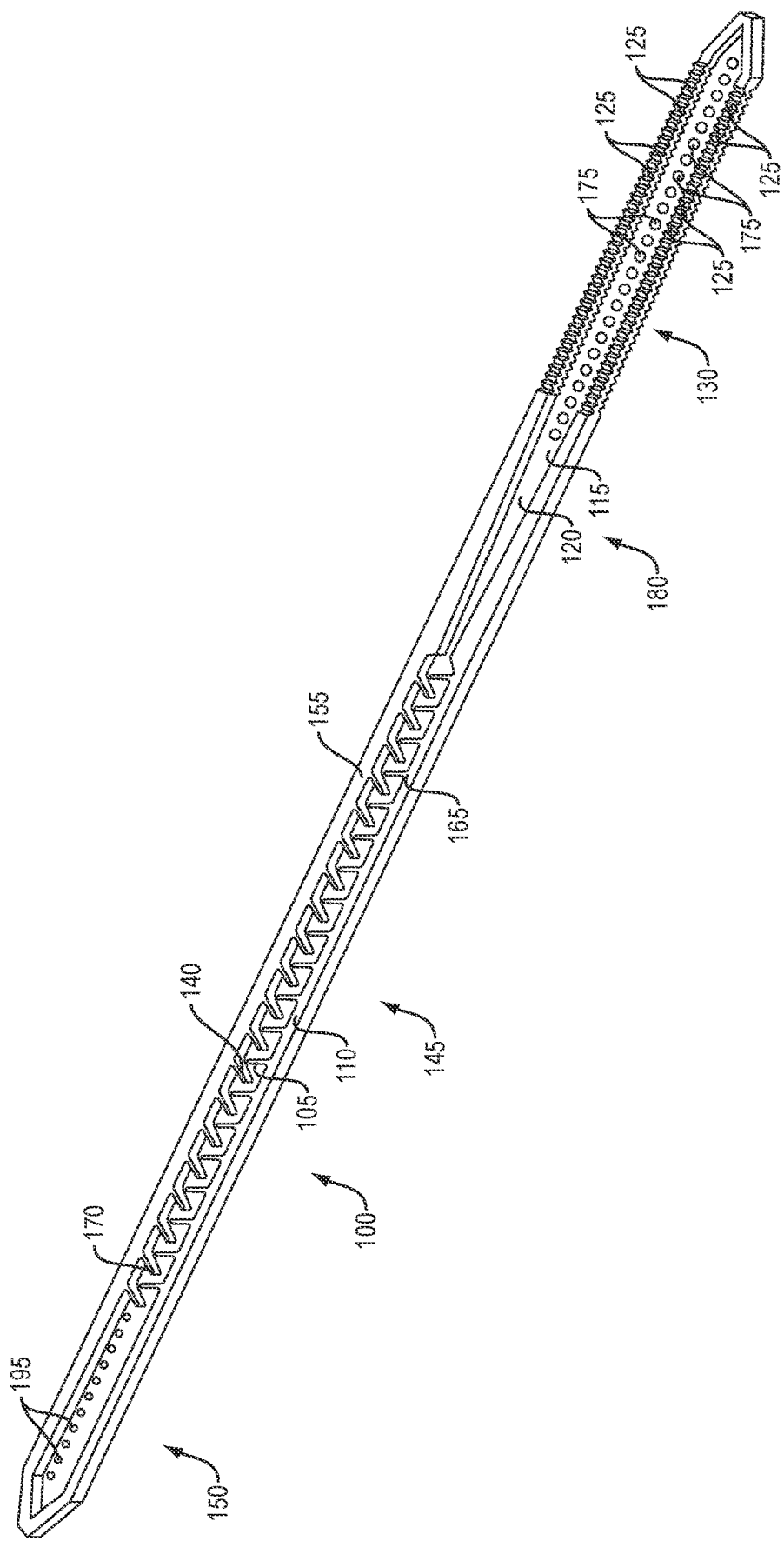
FIG. 1 shows an isometric view of an emitter for discharging liquid

Discrete emitters have been produced for a period of time using a silicone diaphragm that deflects under varying pressure onto a metering groove. This metering groove is sufficiently small to allow only a certain amount of water to pass regardless of the pressure. While this technique has been used, the nature of this design can cause plugging and the use of a thermoset silicone is expensive and limits the design of the product. These emitters are also individually molded units and do lend themselves to continuous production easily. A novel approach to solve this problem would be to use a continuously formed ribbon as the emitter and have that ribbon compensate for pressure. By using a special flexible olefin block copolymer; this ribbon can easily be bonded to the main body of the tube. The flexibility of the polymer is only one aspect of the compensation technique. The teeth of the flow path that would normally be bonded to the tube are not in this case bonded but instead a rail that rides slightly above the teeth is bonded to the tube. This allows for varying number of teeth to engage the body of the tube depending on pressure and consequently compensates for pressure. Conventional design techniques require a pressure reduction area or labyrinth prior to the metering groove. This area is also prone to plugging causing variations in the compensation capabilities as well as plugging of the metering groove. The advantage provided by the invention is that the compensation starts at the distal end of the flow path and progresses towards the proximal end as the pressure increases. If there are any debris in the emitter, the backpressure will increase causing the entire flow path to disengage from the main body of the tube causing the debris to pass. The advantage of this design is that when pressure is relieved the flow path again becomes a straight through path flowing over the teeth and allowing any built up debris to pass through. Also during operation if the path becomes clogged the pressure will open the flow path and allow the debris to pass. The unique nature of the polymer allows the bonding of the rails and the flexibility of the teeth of the flow path to both compensate and be clog resistant.

The design of the flow path described above coupled with the unique characteristics of the olefin block copolymer allow the flowpath to be formed in a very precise manner and be bonded in a unique manner to the main body of the tube. Since both materials are of an olefinic base a strong bond is insured. The design of the teeth is precisely radiused to compensate for the structure of the tube. The teeth can also be tapered along the length of the flowpath to further aid in compensation. To achieve this type of performance requires a combination of precise rotary mold design, product design and polymer properties to work effectively.

The number of intervals that interact with the fluid flow passage depends on the pressure differential starting at the outlet end and progressing towards inlet at increasing main body pressure channels.

FIG. 1 shows an isometric view of an emitter 100 for discharging liquid. The liquid that the emitter is capable of emitting can be water or any solution. The emitter 100 can be used for purposes of irrigation and specifically drip irrigation where water or any water based solution has to be supplied to the irrigated area. The solution can be a solution of any water soluble compound in water that is to be supplied to the plants in the irrigated area.

Figure 3:
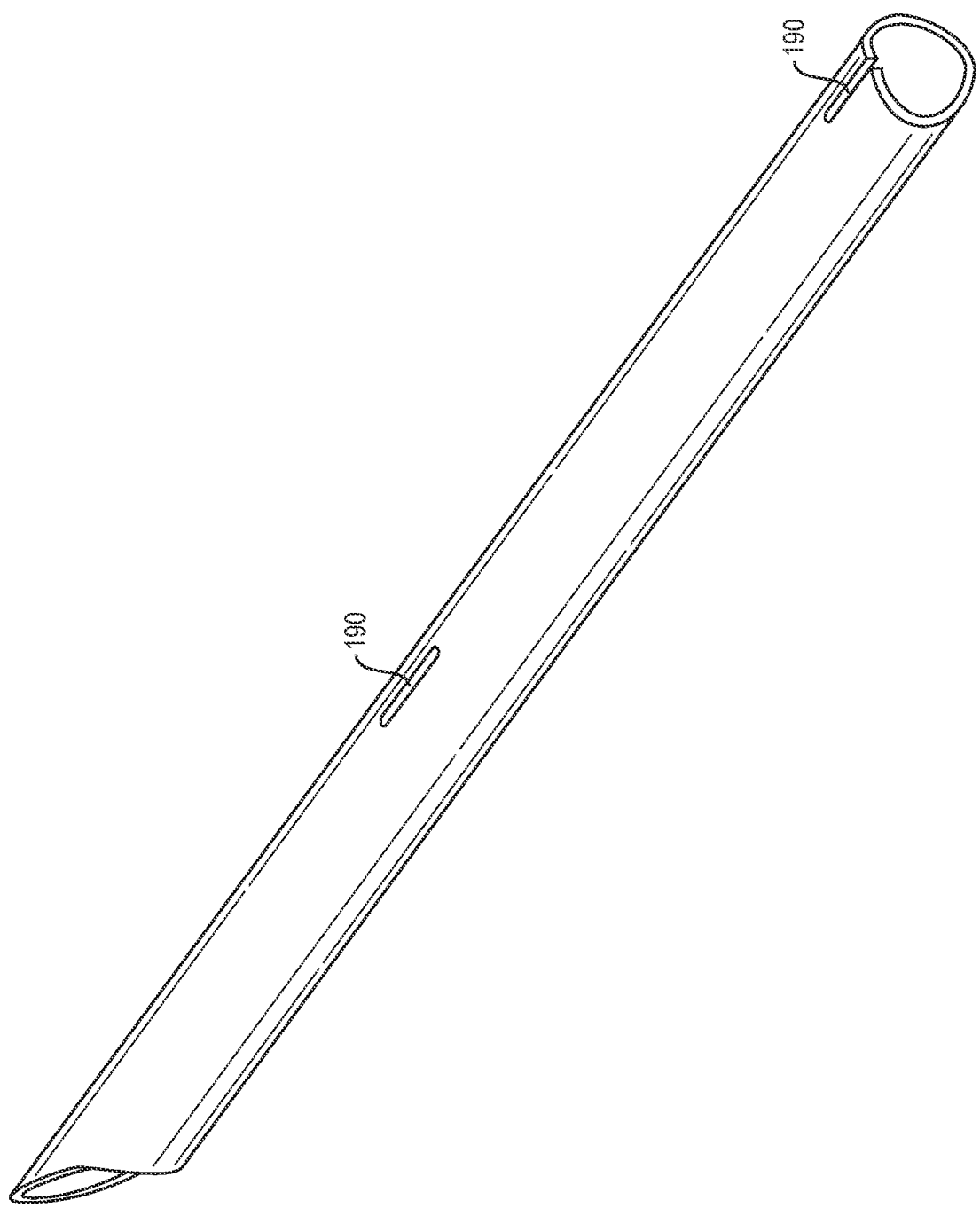
FIG. 3 shows an aperture in a fluid conduit for discharge of fluid

As illustrated in FIG. 1, the emitter 100 comprises an elongated frame 105 with a periphery 110. The periphery can also be referred to as an edge running completely around the elongated frame 105. The periphery 110 is higher than a base 115 of the elongated frame 105. The base 115 runs throughout the entire length of the elongated frame 105. The periphery 110 running around the elongated frame 105 encloses a cavity 120. The periphery 110 enables attaching the emitter to an internal surface of a fluid conduit (not shown). The working of the emitter 100 in conjunction with the fluid conduit is described hereinafter. To elaborate, the emitter 100 is fitted or attached to the inside surface or internal surface of the fluid conduit and the fluid from the fluid conduit enters the cavity 120 of the emitter 100 and flows out through an aperture 190 on the fluid conduit, as illustrated in FIG. 3. FIG. 3 shows the aperture 190 in the fluid conduit for discharge of fluid from the emitter. FIG. 3 illustrates that any fluid conduit can accommodate a plurality of emitters with the plurality of emitters communicating to the environment through a plurality of apertures 190 arranged linearly.

The emitter 100 comprises a plurality of intervals 125 disposed in the periphery 110 at a first end 130 of the elongated frame 105. The plurality of intervals 125 enables fluid communication between the cavity 120 and a fluid flow passage (not shown) of the fluid conduit to receive fluid from the fluid flow passage. In other words, when in use, the fluid passes through the plurality of intervals 125 from the fluid flow passage to the cavity 120.

Figure 2:
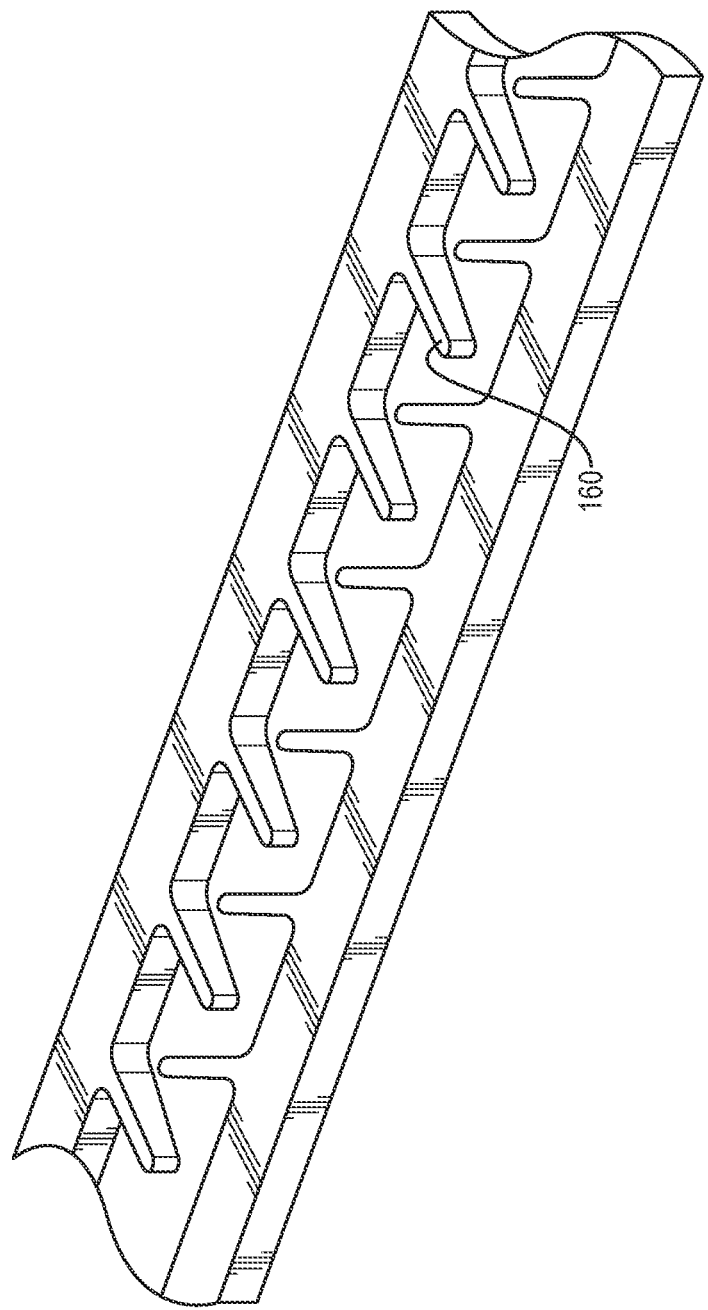
FIG. 2 shows an enlarged view of a plurality of projections in the emitter

The emitter 100 further comprises a plurality of projections or teeth 140 disposed in a middle portion 145 of the elongated frame 105. The middle portion 145 is disposed between the first end 130 and a second end 150. The plurality of projections 140 extend from the periphery 110 on both sides of the elongated frame 105 towards the center of the cavity 120. In other words, the plurality of projections 140 extends towards each other from the periphery 110 on both sides of the elongated frame 105. The plurality of projections 140 from the opposite sides of the periphery 110 do not touch or contact each other, such that fluid from the first end 130 can flow through the plurality of projections 140 to the second end 150. Each of the plurality of projections 140 has a first surface 155 that slopes downwards from the periphery towards the center of the cavity 120. The surface of each of the plurality of projections 140 opposite the first surface 155 is a second surface 160 (as shown in FIG. 2). FIG. 2 shows an enlarged view of the plurality of projections 140 in the emitter 100. The second surface 160 is mounted on the base 115 of the elongated frame 105.

To elaborate, if the first surface 155 is oriented towards the top, then the second surface 160 is oriented towards the bottom. Alternately, if the first surface 155 is oriented towards the bottom, then the second surface 160 is oriented towards the top. Since the plurality of projections 140 are mounted on the base 115, a deflection of the base 115 deflects the plurality of projections 140 as well depending on the direction of deflection of the base 115. The deflection of the base 115 is caused by a pressure gradient between the pressure in the cavity 120 and the pressure in the fluid conduit. To elaborate, if the pressure in the fluid conduit is higher than the pressure in the cavity 120, then the base 115 is deflected in a direction towards the internal surface of the fluid conduit, such that the cross-sectional surface area and the volume of the cavity is reduced. The plurality of projections 140 in the cavity 120 enables obstruction of the flow of the fluid through the emitter so that the speed and pressure of the flowing fluid is reduced. The pressure of the fluid flowing through the teeth 140 gradually reduces from an initial portion 165 of the plurality of projections 140 to a terminating portion 170 of the plurality of projections 140. Moreover, the arrangement of the plurality of projections 140 as illustrated in FIG. 2 provides a flow path that is winding for the fluid which enables a reduction of the speed of flow of the fluid from the initial portion 165 of the teeth 140 to the terminating portion 170 of the teeth 140.

When in use, the fluid passing through the plurality of teeth 140 flows into the cavity 120 at the second end 150. The fluid conduit in the proximity of the second end 150 comprises aperture 190 open to the atmosphere. The pressure compensated fluid flowing into the cavity 120 at the second end 150 egresses out of the aperture 190 in the fluid conduit to the outside atmosphere for irrigation or other suitable purposes. The first end 130 and the second end 150 are linearly opposite end portions of the elongated frame 105.

The plurality of intervals 125 are disposed on the periphery 110 on both sides of the elongated frame 105. The advantage of this arrangement is that fluid can enter the cavity 120 of the elongated frame 105 from both sides of the cavity 120. The fluid then flows from the first end 130 of the elongated frame 105 to the second end 150 of the elongated frame 105 and flows out of the elongated frame 105. The plurality of intervals 125 extends from the first surface 155 of the periphery 110 to the base 115 of the elongated frame 105. There are a set of hemispherical structures 175 mounted linearly on the base 115 of the elongated frame 105 in the first end 130 between the periphery 110.

The elongated frame 105 comprises an intermediate portion 180 between the first end 130 and the middle portion 145. The periphery of the intermediate portion 180 has a width which is greater than a width of the periphery 110 in the first end 130, the second end 150 and the middle portion 145. The increased width of the periphery 110 in the intermediate portion 180 reduces width of the cavity 120 of the elongated frame 105 in the intermediate portion 180. The width of the periphery 110 in the intermediate portion 180 on both sides can increase from an end proximal to the first end to an end proximal to the middle portion. In other words, the width of the cavity is greater at the end proximal to the first end than the width of the cavity at the end proximal to the middle portion.

The plurality of projections or the teeth 140 are made of the same material as the base 115 and therefore imparts the same flexibility as the base 115. The teeth 140 are disposed such that they make an angle with the periphery 110. In other words, they are not arranged normal to the periphery 110. The teeth 140 are arranged such that they project towards the second end 150. The teeth from the opposite periphery do not touch each other, thus providing a winding pathway for the fluid to flow from the first end 130 to the second 150. The fluid when flowing through the winding pathway is reduced in pressure from the inlet pressure existing at the first end 130 to the outlet pressure existing at the second end 150.

The pressure of the fluid flowing through the cavity 120 of the elongated frame 105 reduces gradually from the first end 130 to the second end 150. However, the pressure of the fluid flowing through the fluid flow passage in the fluid conduit is constant. As the pressure reduces along the elongated frame 105 from the first end 130 to the second end 150, a pressure gradient increases gradually from the first end 130 to the second end 150.

Higher the inlet pressure, higher the pressure gradient in the middle portion 100 proximal to the second end 150. Higher the pressure gradient across the base 115 of the elongated frame 105 in the middle portion 100 proximal to the second end 150, there will be a greater push by the fluid in the fluid flow passage of the fluid conduit on the base 115 to push the base 115 and the second end towards the interior surface of the fluid conduit. For example, if the inlet pressure is 6 psi, a few teeth in the middle portion 100 proximal to the second end 150 are pushed towards the interior surface of the fluid conduit. For example, if the inlet pressure is 10 psi, more teeth in the middle portion 100 proximal to the second end 150 are pushed towards the interior surface of the fluid conduit. For example, if the inlet pressure is 14 psi, even more teeth in the middle portion 100 proximal to the second end 150 are pushed towards the interior surface of the fluid conduit. This pressure gradient and the subsequent deflection of the base 115 towards the interior surface of the fluid conduit helps in pushing the fluid out of the aperture.

The second portion 150 has a set of hemispherical balls 195 mounted on the base 115.

It is to be understood that the foregoing description is intended to be purely illustrative of the principles of the disclosed techniques, rather than exhaustive thereof, and that changes and variations will be apparent to those skilled in the art, and that the present invention is not intended to be limited other than as expressly set forth in the following claims.

We claim:

1. An emitter for discharging liquid bonded to a tube, comprising:
   an elongated frame with a periphery, the periphery being higher than a base of the elongated frame such that the periphery encloses a cavity therewith and the base runs throughout an entire length of the elongated frame, the periphery enabling attachment of the elongated frame to an interior surface of a fluid conduit and wherein the base is arranged to deflect in response to a pressure differential between a pressure in the cavity and a pressure in a fluid flow passage of the fluid conduit;
   a plurality of intervals disposed on the periphery on both sides of the elongated frame at a first terminal end of the elongated frame, the first terminal end acts as an inlet and the plurality of intervals enabling fluid communication between the cavity and the fluid flow passage and arranged to receive fluid from the fluid flow passage; and
   a plurality of flexible projections composed of a same material as the base and disposed approximately at a middle portion of the elongated frame and extending from the periphery on both sides of the elongated frame towards a center of the cavity, the plurality of flexible projections arranged to provide compensation from a distal end of the emitter and progresses towards a proximal end as the pressure increases, and to deflect with a deflection of the base, wherein the first surface of the flexible projections and the base increasingly adjust towards the interior surface of the fluid conduit as pressure increases in the fluid flow passage; and
   an intermediate portion between the first terminal end and the middle portion of the elongated frame, a width of the periphery of the frame in the intermediate portion on both sides of the elongated frame increasing from an end proximal to the first terminal end to an end proximal to the middle portion thereby reducing the width of the cavity of the elongated frame in the intermediate portion;
   wherein surfaces of each of the plurality of flexible projections disposed at an angle to the periphery on both sides of the elongated frame and projecting towards the center of the cavity and a second terminal end, the second terminal end acts as an outlet, wherein each of the plurality of flexible projections has a first surface that is mounted on the periphery and slopes downwards from the periphery towards the center of the cavity, and has a second surface mounted to the base of the elongated frame and the cavity at the second terminal end of the elongated frame is arranged to receive pressure compensated fluid from the middle portion and the plurality of flexible projections are radiused to compensate the structure of the tube,
   wherein the cavity is arranged to communicate fluidly through an aperture on the tube, the first terminal end and the second terminal end being linearly opposite end portions of the elongated frame, the middle portion positioned directly prior to the second terminal end of the elongated frame, wherein the emitter is a molded unit and further comprises a first set of hemispherical structures defined on the first terminal end to the intermediate portion, and a second set of hemispherical structures defined on the second terminal end.

2. The emitter for discharging liquid as claimed in claim 1, wherein a width of the periphery in the intermediate portion on both sides of the elongated frame is greater than a width of the periphery in the first terminal end, the second terminal end and the middle portion.

3. The emitter for discharging liquid as claimed in claim 1, wherein the plurality of flexible projections and the base are composed of olefin block copolymer.

4. The emitter for discharging liquid as claimed in claim 1, wherein if the pressure in the fluid conduit is higher than the pressure in the cavity, then the base is deflected in a direction towards an internal surface of the fluid conduit, such that a cross-sectional surface area and a volume of the cavity is reduced.

5. The emitter for discharging liquid as claimed in claim 1, wherein the periphery is configured to detach from the fluid conduit responsive to backpressure from debris in the liquid.

6. The emitter for discharging liquid as claimed in claim 5, wherein the periphery is configured to reattach to the fluid conduit upon relief of the backpressure following passage of the debris through the fluid conduit.

7. The emitter for discharging liquid as claimed in claim 1, wherein the plurality of intervals extend from the first surface of the flexible projections to the base of the elongated frame.

8. The emitter for discharging liquid as claimed in claim 1, wherein the second set of hemispherical structures extend from the second terminal end to the cavity.

* * * * *